United States Patent

[11] 3,526,184

[72] Inventor Fritz Carl Richter
Calmbach, Black Forest, Germany
[21] Appl. No. 561,175
[22] Filed June 28, 1966
Continuation-in-part of Ser. No. 509,866, Nov. 26, 1965, now Pat. No. 3,392,650.
[45] Patented Sept. 1, 1970
[73] Assignee Prontor-Werk Alfred Gauthier G.m.b.H.,
Calmbach, Black Forest, Germany
a corporation of Germany
[32] Priority June 29, 1965
[33] Germany
[31] No. P37,159

[54] PHOTOGRAPHIC SELF-COCKING SHUTTER WITH RECIPROCABLE SHUTTER BLADES AND DRIVING DEVICE
8 Claims, 5 Drawing Figs.
[52] U.S. Cl. ........................................ 95/63
[51] Int. Cl. ........................................ G03b 9/62
[50] Field of Search ........................................ 95/53, 63

[56] References Cited
UNITED STATES PATENTS
| | | | |
|---|---|---|---|
| 1,828,215 | 10/1931 | Barenyi | 95/63 |
| 2,953,075 | 9/1960 | Barth | 95/63 |
| 3,041,949 | 7/1962 | Buhrle | 95/63X |
| 3,187,653 | 6/1965 | Rentschler | 95/53 |

Primary Examiner—John M. Horan
Attorney—Arthur A. March

ABSTRACT: A photographic self-cocking shutter is provided that has reciprocal shutter blades and a driving device with a driving member for driving the shutter blades. An escapement acts on the driving device in the open position of the shutter blades in order to obtain different exposure times. An operating lever and a cocking release member acting on the lever is provided for operating the shutter. A locking lever is coupled with the operating lever and acts upon the driving member when required. A lever arrangement is associated with the operating lever and is transferable into an operative position for taking B and/or T pictures. A lever arrangement cooperates with the cocking and release member to retain the operating lever in a position in which the locking lever blocks the driving member in the open position of the shutter blades.

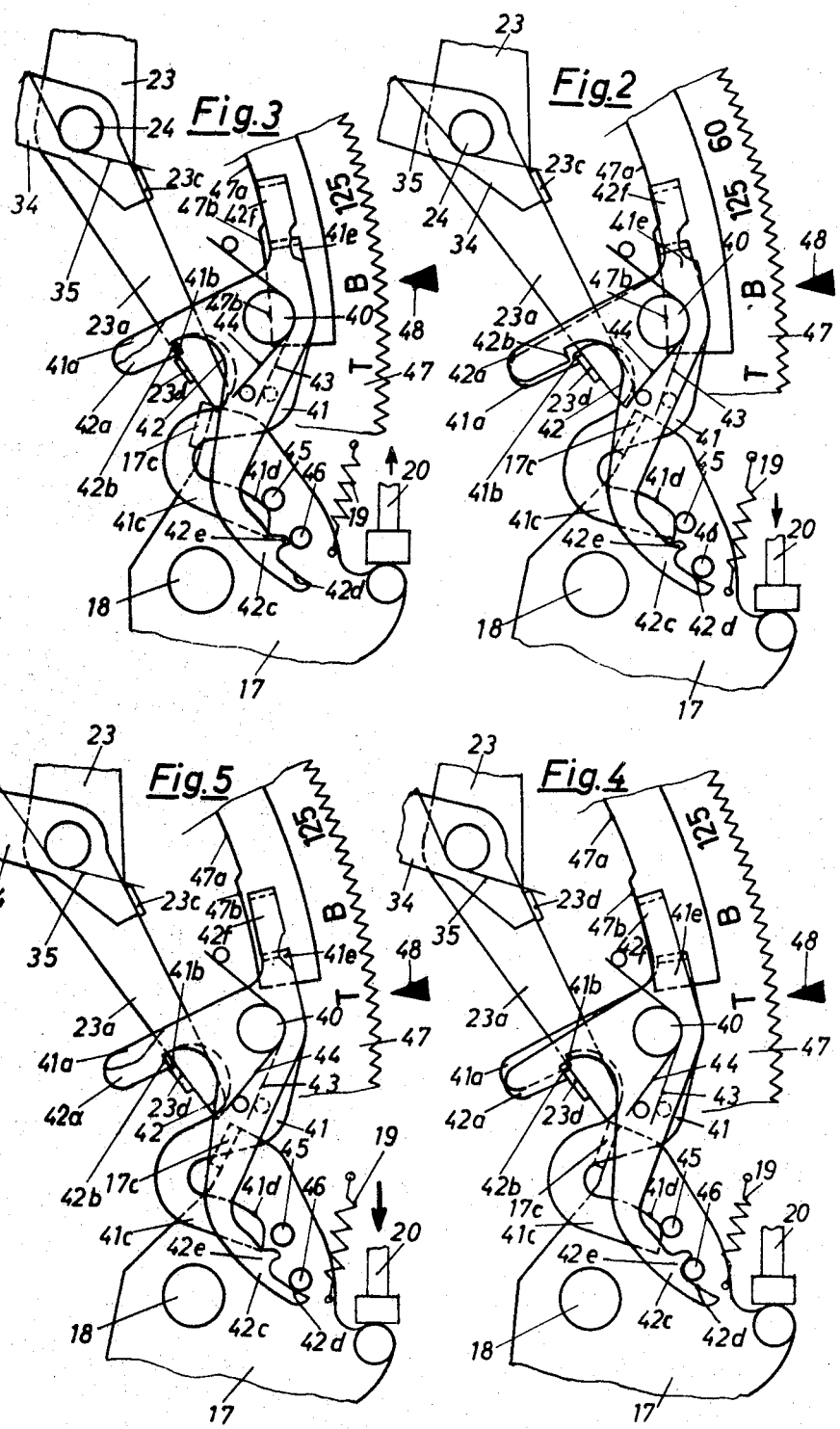

PHOTOGRAPHIC SELF-COCKING SHUTTER WITH RECIPROCABLE SHUTTER BLADES AND DRIVING DEVICE

The present invention relates to a photographic self-cocking shutter having shutter blades which can be reciprocated by a driving device, and whose driving member is affected in the open position, by an escapement device for obtaining different exposure times.

The present invention is a continuation-in-part of the parent application Ser. No. 509,866, filed Nov. 26, 1965, now U.S. Pat. No. 3,392,650. The parent application discloses a shutter provided with a two-arm operating lever which is acted upon by a return spring. This lever participates, during the cocking process, in the movement of the cocking and release element, and carries, at one end, an armature cooperating with an electromagnet controlled by an electronic timing device. Aside from this, the two-arm operating lever is associated with a locking lever which moves with the latter and engages the driving element of the shutter blades when they are in their open position. The locking lever is moved out of the locking position during the return of the operating lever. The particular design assures that all operating elements function in a positive manner and in the proper sequence. However, the design of the parent application is limited to those exposure times that can be provided by the electronic timing device.

Accordingly it is an object of the present invention to improve the self-cocking shutter of the parent application by providing means for increasing the range of exposure times beyond that obtainable with the electronic timing device.

Another object of the present invention is to improve the self-cocking shutter, as set forth, with a minimum of structural elements.

A further object of the present invention is to provide an improved self-cocking shutter, as set forth, which functions fully reliably in all setting positions and within all of its operating ranges.

A still further object of the present invention is to provide an improved self-cocking shutter, as set forth, which may be manufactured simply and economically.

With the preceding objects in view, the invention consists of a driving device with a driving member for driving the shutter blades, an escapement acting upon the driving device in the open position of the shutter blades to obtain different exposure times, an operating lever and a cocking and release member acting upon the lever for operating the shutter, a locking lever coupled with the operating lever and acting upon the driving member when required, and a lever arrangement associated with the operating lever and transferable into an operative position for taking B and/or T pictures. The lever arrangement cooperates with the cocking and release member to retain the operating lever in a position in which the locking lever blocks the driving member in the open position of the shutter blades.

The novel features of the invention appear in the appended claims. The detailed description of the invention, however, appears in the following specification taken in conjunction with the accompanying drawing in which:

FIG. 2 is an enlarged view of a section of the shutter of FIG. 1, and shows, at the end of the cocking operation, the lever arrangement wherein an arresting lever locks an operating lever in the open position of the shutter blades, the resetting member being slightly displaced toward the center of the shutter when compared to the arrangement of FIG. 1;

FIG. 3 shows the lever arrangement of FIG. 2 with the release plunger not depressed and the arresting lever becoming operative and releasing the operating lever in the B setting of the camera;

Figure 1:
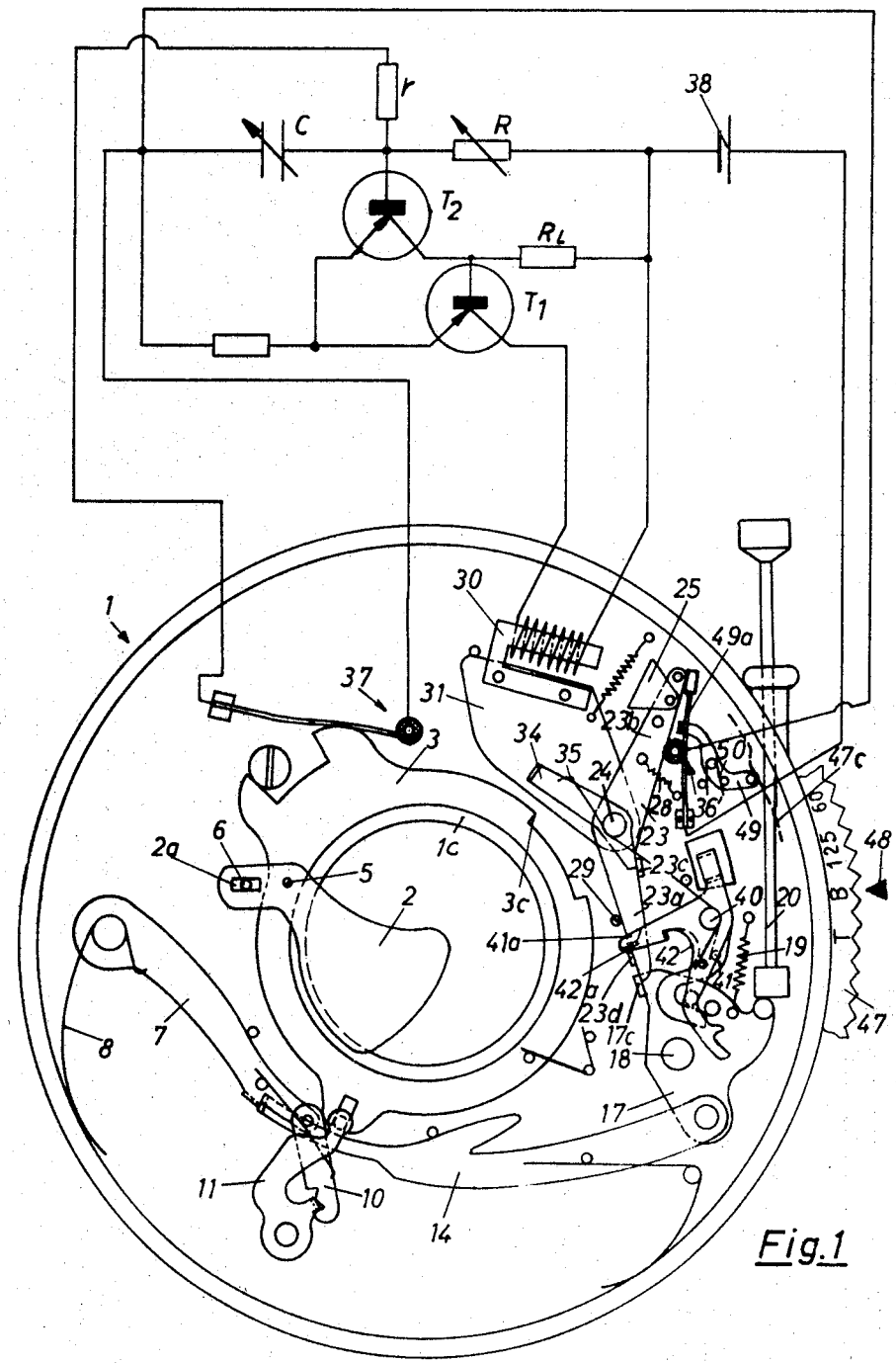
FIG. 1 is a plan view of a self-cocking shutter with the front plate removed, and shows a lever arrangement for taking B and T pictures and a schematically-represented electronic timing device, the shutter being set in the initial or starting position for taking B pictures.

FIG. 4 shows the lever arrangement of FIG. 2 for taking T pictures, the arrangement being in an intermediate position wherein the locking of the operating lever is effected in the open position of the shutter blades, after the release plunger is freed by a second arresting lever; and FIG. 5 shows the lever arrangement in the same setting position of FIG. 4, and wherein the closing operation is initiated by depressing, again, the release plunger.

Referring to the drawing, the driving ring 3 is rotatably mounted on the socket 1c of the shutter housing 1. The driving ring serves to move back and forth the shutter blades 2. The latter are mounted, on the one hand, through means of the journal or pivot 5 for rotatable motion on the driving ring, and, on the other hand, by means of the guiding pin-slot joint 6—2a.

Similar to that described in the parent application, a commonly known driving mechanism is associated with the driving ring 3 for opening and closing the shutter blades 2. The driving mechanism is provided with a driving lever 7 acted upon by a driving spring 8, a sliding pawl 10 articulated at its free end, and a stationary intermediate lever 11 operatively connected, on the one hand, with the pawl and, on the other hand, with the driving ring. A pawl 14 is provided to move the driving lever 7 into the cocked position. This pawl is linked to a cocking and release member 17 which is designed as a reversing lever rotatably mounted on a pin 18 and bearing against the release plunger 20, due to the action of tension spring 19.

For the purpose of taking pictures of different exposure times, an escapement is associated with the shutter blade drive described above. The escapement is controlled by the electronic timing device and blocks the driving mechanism in the open position of the shutter blades 2. The escapement is functionally connected to the electronic timing device through a two-armed operating lever 23 which is mounted on pivot 24 and which bears with its arm 23a against a bent-up lug 17c of the reversing lever 17, during the cocking process. The other arm 23b carries an armature 25 and is acted upon by a spring 28 which tends to maintain the lever 23 against the fixed pin 29. The armature 25 is associated with an electromagnet 30 mounted on a pivotable plate 31. The electromagnet is controlled by the afore-mentioned electronic timing device designed in the form of monostable circuit comprised of the two transistors $T_1$ and $T_2$, the capacitor C, and the variable resistor R. Through the action of a switch 36' operated by the lever 23, the electronic timing device or circuit can be connected to the battery 38.

For the purpose of blocking the drive of the shutter blades 2 in the open position, a locking lever 34 is provided. The latter is associated with the driving ring 3 and held, by the spring 25, against a lug 23c of the operating lever 23 which coaxially supports the locking lever. The driving ring 3 is provided with a stop edge 3c engaged by the locking lever 34 in the open position of the shutter blades so that the shutter drive is blocked.

In order to take, with the arrangement of the parent application, B and T exposures in addition to those controlled by the electronic timing device, a particular lever arrangement is provided with respect to the operating lever 23. This lever arrangement becomes operative, instead of the electromagnet 30, after a corresponding adjustment of the camera, and locks the operating lever in the position in which the locking lever 34 blocks the shutter blade drive in the open position.

The preceding lever arrangement comprises two arresting levers 41 and 42, coaxially mounted on a fixed pin 40, and each having three arms. As shown in FIG. 1, the arms 41a and 42a of the levers 41 and 42, respectively, bear against the lug 23d, due to springs 43 and 44 respectively, when the camera is set to either B or T in the non-operating position of the shutter. As apparent from FIGS. 2 to 5, each arm 41a and 42a is provided with a locking edge 41b and 42b, respectively. The edge 41b is somewhat closer situated to the bearing pin 40 than the edge 42b.

Each of the levers 41 and 42 has also an arm 41c and 42c, respectively, secured to the reversing lever 17. The operating pin 45 cooperates with the cam 41d of the lever arm 41c, while the pin 46 can engage the edge 42d associated with the lever arm 42c. The arm 42c, moreover, is provided with a nose 42e which is engaged by the operating pin 46 when taking T exposures or pictures.

The two arresting levers 41 and 42 can be moved into and out of the operative position by means of an exposure time setting member 47 serving to adjust the camera. A control cam which cooperates with the third lever arms 41e and 42f, is provided on the member 47. A fixed indicator 48 is also associated with the exposure time setting member 47.

The lever arms 41e and 42f are designed so that they bear against the cam segment 47a of the control cam, when an instantaneous exposure time is set by means of the setting member 47. In this manner, the two arresting levers 41 and 42 can have no locking effect upon the operating lever 23. When the camera is set to the B position, corresponding to FIGS. 2 and 3, the lever arm 41e leaves the cam segment 47a and moves into the range of the curved section 47b. This permits the lever 41 to swing out counterclockwise, while the lever 42 is retained in its inoperative position. If, on the other hand, the camera is set for taking T pictures (FIGS. 4 and 5), both lever arms 41e and 42f are within the range of the curved section 47b, and accordingly both arresting levers 41 and 42 can act upon the operating lever 23 when the shutter is actuated.

In order that the electronic timing device and the electromagnet 30 are disconnected and de-energized, respectively, when taking B and T pictures, an additional lever 49 is provided as shown in FIG. 1. Corresponding to B and T settings of the camera, this lever 49 bears, at one end, against a cam 47c of the member 47 due to spring 50. At the other end of this lever, the lug 49a is moved in front of the contact spring of switch 36'. In this manner, the switch remains open when the shutter is actuated. When, however, an instantaneous exposure time is set, the lever 49 loses its support on the cam 47c and, due to the action of spring 50, it turns counterclockwise so that the switch 36' can close the circuit of the electronic timing device during the cocking process.

The preceding shutter arrangement operates in the following manner:

For the purpose of taking pictures with instantaneous exposure times, the time setting member 47 is set as usual to the desired value. While the lever 49 assumes an inoperative position with regard to contact switch 36', the arresting levers 41 and 42 are held by the cam segment 47a in a position corresponding to FIG. 3. With this arrangement, neither of the arresting levers can cooperate with the lever arm 23a, nor be acted upon by the operating pins 45 and 46 of the reversing lever 17. When the latter is turned clockwise due to depression of the release plunger 20, the operating lever 23 performs a counterclockwise movement and the pawl 14 moves to the left with respect to FIG. 1. While the operating lever 23 rotates, the switch 36' becomes closed, and as a result the electromagnet 30 becomes energized. The armature is consequently attracted to the electromagnet and is held in this state for as long as the latter is energized. Aside from this, the locking lever 34 is brought to bear against the driving ring 3.

With the lateral displacement of the pawl 14, the driving lever 7 arrives in the cocked position. However, the sliding pawl 10 still leaves the intermediate lever 11 in its non-operating position, and, accordingly, the shutter remains closed. At the end of this cocking movement, and after the arm 23a has already left the lug 17c of the reversing lever, the pawl 14 becomes disengaged from the driving lever 7. Due to the action of the driving spring 8, the lever 7 now rotates counterclockwise and imparts a reciprocating rotary motion to the driving ring 3, by means of the sliding pawl 10 and the intermediate lever 11. As a result, the shutter blades 2 move, at first, into the open position. With the beginning of the driving motion, the ring 3 opens a contact switch 37 and allows, thereby, the charging of the capacitor C. When the driving ring 3 reaches the position corresponding to the open position of the shutter blades 2, the locking lever 34 drops in front of the edge 3c and blocks any further movement of the driving mechanism.

When the charging of the capacitor C is completed, the transistor $T_2$ begins to conduct and, as a result, the transistor $T_1$ is cut off. The charging time of the capacitor is dependent upon the values of the latter and the resistor R. With transistor $T_1$ cut off, the electromagnet 30 is de-energized, and therefore the operating lever 23 can return to its initial position of FIG. 1, due to the action of spring 28. The operating lever thereby opens the switch 36' and disengages the locking lever 34 from the driving ring 3 so that the shutter blades 2 are immediately returned to their closed position.

If B pictures are to be taken with the preceding shutter arrangement, the exposure time setting member 47 is turned so that the lever 41 bears against the lug 23d by means of its lever arm 41a. When setting the member 47, moreover, the lever 49 rides, at one end, against the cam 47c, and as a result the electronic timing device cannot be actuated because switch 36' is held in the open position.

When the release plunger 20 is depressed, the reversing lever 17 turns clockwise again, and carries along, in opposite direction, the operating lever 23 over the lug 17c. The driving lever 7 moves, at the same time, into cocking position. Toward the end of the rotary movement of the reversing lever 17, the operating pin 45 is situated in front of the free end of the lever arm 41c. Accordingly, the arresting lever 41 can move into the locking position shown in FIG. 2, due to the action of spring 43. Immediately thereafter, the lug 17c is disengaged from the lever arm 23a, and the operating lever 23 is prevented from returning to its initial or starting position because it is retained by lever 41 which is in the locking position illustrated in FIG. 2.

After disengagement of the lever arm 23a from the lug 17c, the pawl 14 is disengaged from the driving lever 7 which now rotates counterclockwise under the action of the driving spring 8. The driving lever 7 thereby brings the driving ring 3, by means of the sliding pawl 10 and intermediate lever 11, into the open position in which the driving mechanism is blocked by the locking lever 34 dropping in front of the edge 3c.

The operating lever 23 now remains in the position corresponding to the open position of the shutter blades, for as long as the photographer retains the release plunger 20 depressed. When the latter is released, the reversing lever 17 returns to its starting position due to the action of the spring 19. The operating pin 45 rides against the cam 41d and causes, thereby, the arresting lever 41 to release the lug 23d and to turn clockwise. The operating lever 23 is thus unlocked and can return to its starting position due to the influence of the return spring 28. At the same time, the locking lever 34 is disengaged from the edge 3c of the driving ring 3, and this moves in turn, the shutter blades 2 immediately into their closed position.

In order to take T pictures, the exposure time setting member 47 is brought into the position illustrated in FIGS. 4 and 5. The cam segment 47a, thereby leaves the lever arm 42f, so that both lever arms 41e and 42f are left within the range of the cam segment 47b. In the T position, both levers 41 and 42 bear against the lug 23d with their lever arms 41a and 42a. When the plunger 20 is depressed, the reversing lever 17, with operating pins 45 and 46 secured thereto, performs again a clockwise movement. In the final phase of this motion, the arresting lever 41 locks the operating lever 23 in the position illustrated in FIG. 2. At this instant, the operating pin 46 rides against the cam 42d of the arresting lever 41, and in the manner described supra, the shutter moves into the open position wherein the shutter drive is blocked again by the locking lever 34. When the plunger 20 is released, the reversing lever 17 returns to its starting position. The arresting lever 41 is thereby brought into the inoperative position by the operating pin 45, while the arresting lever 42 performs a counterclockwise movement due to the special design of the lever arm 42c and cam 42d. As a result, the operating lever 23 is locked due to the locking edge 42b.

During the return of the reversing lever 17 to its starting position, the operating pin 46 engages the nose 42e of the lever 42, as shown in FIG. 4. Accordingly, the photographer need no longer depress the release plunger 20 through its entire stroke in the subsequent actuation which starts the closing movement. In the diagram of FIG. 4, wherein the operating lever 23 and the reversing lever 17 are locked by the arresting lever 42, the shutter drive is thus blocked in the open position of the shutter blades 2 with the plunger 20 released.

In order to start the closing motion, the release plunger 20 is again depressed whereby the arresting lever 42 moves from the locking position shown in FIG. 4, and into the position of FIG. 5 wherein the locking edge 42b has moved out of the path of lug 23d. As a result, the operating lever 23 can return to its starting position, and the locking lever 34 is moved out of the locking position so that the driving ring 3 can return the shutter blades 2 into their closed position.

While the invention has been described in detail, it will be understood that the description only shows one example thereof and that variations and modifications may be made without departing from the spirit of the invention as defined in the appended claims.

I claim:

1. In a photographic self-cocking shutter with reciprocable shutter blades, a driving device with a driving member for driving said shutter blades, an escapement acting upon said driving device in the open position of said shutter blades to obtain different exposure times, an operating lever and a cocking and release member acting upon said lever for operating said shutter, a locking lever coupled with said operating lever and acting upon said driving member when the shutter blades reach the open portion and lever means associated with said operating lever and transferable into an operative position for taking B and/or T pictures, said lever means cooperating with said cocking and release member to retain said operating lever in a position in which said locking lever blocks said driving member in the open position of said shutter blades, and wherein said lever means includes a first arresting lever locking said operating lever in both B and T positions, and a second arresting lever locking said operating lever exclusively in the T position.

2. The invention as defined in claim 1, including a reversing lever for returning said first and second arresting levers to their initial positions from which they can be brought into engagement with said operating lever upon the movement of said cocking and release member.

3. The invention as defined in claim 2, including an electronic timing device for generating exposure times, an electrical energy source for energizing said electronic timing device, a switch whereby said electronic timing device and said energy source may be connected and disconnected, and a springloaded lever associated with said reversing lever and acting upon said switch so that said electronic timing device is disconnected from said energy source when taking B or T pictures.

4. The invention as defined in claim 1, wherein each of said arresting levers has three arms, and wherein a first operating pin is situated on said cocking and release member and associated with a first arm of said first arresting lever, and a second operation pin situated on said cocking and release member and associated with a first arm of said second arresting lever, said lever arms being associated with said operating pins so as to move said arresting levers into the locking position wherein a second arm of said first and second arresting levers locks said operating lever in a position corresponding to the open position of said shutter.

5. In a photographic self-cocking shutter with reciprocable shutter blades, a driving device with a driving member for driving said shutter blades, an escapement acting upon said driving device in the open position of said shutter blades to obtain different exposure times, an operating lever and a cocking and release member acting upon said lever for operating said shutter, a locking lever coupled with said operating lever and acting upon said driving member when required, and a lever arrangement associated with said operating lever and transferable into an operative position for taking B and/or T pictures, said lever arrangement cooperating with said cocking and release member to retain said operating lever in a position in which said locking lever blocks said driving member in the open position of said shutter blades, and wherein said lever arrangement includes a first arresting lever locking said operating lever in both B and T positions, and a second arresting lever locking said operating lever exclusively in the T position, and wherein each of said arresting levers has three arms, and including a first operating pin situated on said cocking and release member and associated with a first arm of said first arresting lever, and a second operation pin situated on said cocking and release member and associated with a first arm of said second arresting lever, said lever arms being associated with said operating pins so as to move said arresting levers into the locking position wherein a second arm of said first and second arresting levers locks said operating lever in a position corresponding to the open position of said shutter.

6. The invention as defined in claim 5, including an arrangement wherein said first arresting lever is operative and engages said operating lever at the end of the cocking movement of said cocking and release member in both B and T settings of said shutter, and said second arresting lever is outside the path of said operating lever, said arrangement being such that said arresting levers are oppositely disposed during the return of said cocking and release member to its initial position.

7. The invention as defined in claim 5, wherein each of said second lever arms has a locking edge and said first and second arresting levers are coaxially mounted on a bearing axis, one of said locking edges becoming operative in the B and T setting positions and being closer situated to said bearing axis than said other locking edge.

8. The invention as defined in claim 5, wherein said first arm of said second arresting lever has a nose abutting said second operating pin during the return of said cocking and release member to its initial position of said shutter.